United States Patent [19]

von Roos

[11] 4,122,383

[45] Oct. 24, 1978

[54] METHOD AND APPARATUS FOR MEASURING MINORITY CARRIER LIFETIMES AND BULK DIFFUSION LENGTH IN P-N JUNCTION SOLAR CELLS

[76] Inventors: Robert A. Frosch, Administrator of the National Aeronautics and Space Administration, with respect to an invention of Oldwig H. von Roos, South Pasadena, Calif.

[21] Appl. No.: 861,391

[22] Filed: Dec. 16, 1977

[51] Int. Cl.² .......................................... G01R 31/024
[52] U.S. Cl. ...................................... 324/20 R; 324/22
[58] Field of Search ............... 136/206; 324/20 R, 24, 324/25, 23, 22, 158 R

[56] References Cited

U.S. PATENT DOCUMENTS

| 3,206,674 | 9/1965 | Thuy | 324/158 R |
| 3,745,454 | 7/1973 | Nikirk | 324/64 |
| 3,919,639 | 11/1975 | Graff | 324/158 R |

OTHER PUBLICATIONS

S. M. Sze, Physics of Semiconductor Devices, Wiley-Interscience, John Wiley and Sons, New York-London-Sydney-Toronto, pp. 65-72.

*Primary Examiner*—M. Tokar
*Attorney, Agent, or Firm*—Monte F. Mott; John R. Manning; Paul F. McCaul

[57] ABSTRACT

Carrier lifetimes and bulk diffusion length are qualitatively measured as a means for qualification of a P-N junction photovoltaic solar cell by alternately applying high frequency (blue) monochromatic light pulses and low-frequency (red) monochromatic light pulses to the cell while it is irradiated by light from a solar simulator, and synchronously displaying the derivative of the output voltage of the cell on an oscilloscope. This output voltage is a measure of the lifetimes of the minority carriers (holes) in the diffused N layer and majority carriers (electrons) in the bulk P material, and of the diffusion length of the bulk silicon. By connecting a reference cell in this manner with a test cell to be tested in reverse parallel, the display of a test cell that matches the reference cell will be a substantially zero output.

9 Claims, 4 Drawing Figures

METHOD AND APPARATUS FOR MEASURING MINORITY CARRIER LIFETIMES AND BULK DIFFUSION LENGTH IN P-N JUNCTION SOLAR CELLS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to a method and apparatus for qualitative measurement of minority carrier lifetimes and bulk diffusion length in P-N junction photovoltaic solar cells.

There is a need to qualify P-N junction photovoltaic solar cells as to their ability to convert solar energy into electricity in a manner that may be automated. It has been shown that if a solar cell is subjected alternately to high frequency (blue) and low frequency (red) light pulses, the minority carrier lifetimes of the diffused N layer and of the bulk P material can be measured. Furthermore, the bulk diffusion length can also be ascertained. Since these parameters determine the efficiency of a solar cell, an object of this invention is to provide a method and apparatus for quick and easy quality control of solar cell production.

For an actual determination of lifetimes and diffusion lengths, the equivalent circuit of the P-N junction diode, the diode admittance and the electrical signal pickup impedance must be known. However, it has been discovered that under certain conditions, this knowledge is not necessary for qualitative measurements.

The steady state current of a P-N junction solar cell has been calculated many times. For the spectral region in the neighborhood of 1.5 to 4.4 eV, it consists of two parts, that of the illuminated N layer and that of the P substrate, respectively. The contribution of the N layer to the total current density is given by:

$$j_p = q N_\lambda L_p L_\lambda^{-1} (G_p - B_p F_p) \tag{1}$$

where.

$$F_p = L_p^{-1} \int_0^d dx \sinh[(d-x)/L_p] e^{-x/L_\lambda} \tag{1a}$$

$$G_p = L_p^{-1} \int_0^d dx \cosh[(d-x)/L_p] e^{-x/L_\lambda} \tag{1b}$$

and $$B_p = \frac{\cosh(d/L_p) + L_{S_p}/(L_p) \sinh(d/L_p)}{\sinh(d/L_p) + L_{S_p}/(L_p) \cosh(d/L_p)} \tag{1c}$$

$L_\lambda$ = absorption length of light of wavelength $\lambda$ (the inverse absorption coefficient).
$L_p$ = diffusion length of the holes in the N layer.
$N_\lambda$ = Photon flux (number per area and time).
$d$ = depth of the junction (distance of the depletion layer from the surface).
$L_{S_p} = D_p/S_p$ = surface diffusion length where $D_p$ = diffusion coefficient of the holes and $S_p$ = surface diffusion velocity.
$q$ = elementary charge.

Introducing the diffusion length $L_n$ for electrons in the P base and $l = T_h - W - d$ where W is the width of the depletion layer and $T_h$ the total thickness of the cell, the contribution to the current density due to electrons is given by $$j_n = q N_\lambda A_n^{-1} (F_n + L_{S_n}/(L_n) G_n) e^{-(d+W)/L_\lambda} \tag{2}$$

with $$A_n = \sinh(l/L_n) + L_{S_n}/(L_n) \cosh(l/L_n) \tag{2a}$$

$$\left. \begin{array}{l} F_n = F_p(d \rightarrow l, p \rightarrow n) \\ G_n = G_p(d \rightarrow l, p \rightarrow n) \end{array} \right\} \tag{2b}$$

The enormous difference in magnitude of $d$ and $l$ plays an important role in the further development. The sum of eqs. (1) and (2) constitutes the total current.

Considering now nonstationary irradiation, suppose a beam of monochromatic light with time varying intensity in the neighborhood of 4.4 eV is irradiating the solar cell. With $d + W \simeq 0.3\mu$ and $L_\lambda \simeq 10^{-2}\mu$ we have $e^{-(d+W)/L_\lambda} \simeq e^{-30}$ and according to eq. (2), the current produced by the P material $j_n$ is negligible. In this case, only the N layer contributes. The opposite is true for a photon energy of 1.5 eV. Here $L_\lambda \simeq 100\mu$ and $e^{-(d+W)/L_\lambda} \simeq e^{-3} 10^{-3} \simeq 1$. All light reaches the P base and, since the length or thickness of the base is a thousand times that of the N layer, almost all current will be generated in the P base. Accordingly, it is convenient to split the analysis into two parts: high frequency (blue light) and low frequency (red light).

1. Blue Light

N layer, hole current.

The diffusion equation for the hole concentration is:

$$\left(\frac{\delta^2}{\delta x^2} - \frac{\delta}{\delta t} - 1\right) p(x,t) = -\tau L_\lambda^{-1} e^{-\alpha x} \Phi(t) \tag{3}$$

with the usual boundary conditions for short circuit:

$$p(0,t) + \beta \frac{\delta p}{\delta x}\bigg|_{x=0} = 0, \; p(d,t) = 0 \tag{4}$$

In eqs. (3) and (4) $x$ and $t$ are measured in units of $L_p$ and $\tau_p$ (lifetime of holes). $\alpha = L_p/L_\lambda$. We also define $\beta = L_{S_p}/L_p$. $\phi(t)$ is the source function proportional to the photon flux. As initial condition, we take $\phi(o) = 0$. A Laplace transformation on time reduces eqs. (3) and (4) to the steady state situation, viz:

$$\zeta p(x,t) = p(x,S) \quad \zeta \phi(t) = \phi(S)$$

and we have:

$$\frac{1}{1+S} \frac{d^2 p}{dx^2} - p = -\tau L_\lambda^{-1} e^{-\alpha x} \frac{\Phi(S)}{1+S} \tag{5}$$

But the solution to eq. (5) satisfying the Laplace transformed counterpart of eq. (4) gives rise to a "stationary" current through eq. (1) if we replace $L_{S_p} \rightarrow \beta$, $L_p \rightarrow (1+S)^{-1/2}$ in eq. (1). Therefore, the current is given by $$j_p(t) = q\alpha \frac{1}{2\pi i} \int ds \frac{\Phi(S)}{1+S} (G_p - B_p F_p) e^{st} \quad (6)$$

where the path of integration is to the right of all singularities. Due to the replacement $L_p \to (1+S)^{-1/2}$ in eqs. (1), the integral of expression (6) contains other than possible poles, a branch cut from $-1$ to $-\infty$. Calling the integrand $\phi(S)F[(1+S)^{1/2}]$ we have:

$$j_p(t) = q\alpha \frac{1}{2\pi i} \int dS\, e^{St} \Phi(S) F(\sqrt{S+1}) + \quad (7)$$
$$q\alpha \frac{1}{2\pi i} \int_1^\infty dS \Phi(-S) e^{-St} [F(-i\sqrt{S-1}) - F(i\sqrt{S-1})]$$

Evidently, the second term on RHS of eq. (7) signifies the transient due to abrupt switching of the photon intensity. Taking a very short pulse to be:

$$\phi(S) = \zeta N_\lambda' T^{-1} S(t) = N_\lambda' T^{-1} \quad (8)$$

with $N_\lambda'$ the total number of photons at wavelength $\lambda$ within the pulse of duration $T \ll \tau_p$ impinging on 1 cm² of the surface of the cell, finally noting that $\cosh ix = \cos x$ and $\sinh ix = i \sin x$, we obtain:

$$j_p = q N_\lambda' T^{-1} \alpha e^{-\alpha d - t} \frac{2}{\pi} \int_0^d dx \int_0^\infty du\, e^{-u^2 t + \alpha x} \{\cos(xu) + \quad (9)$$
$$(\beta^2 - 1)(\beta^2 \cos^2(ud) + \sin^2(ud))^{-1} \sin(ud) \cos(ud) \sin(xu)\}$$

The integral of eq. (9) can only be done analytically if $\beta = 1$, i.e. if the surface diffusion length is equal to the bulk diffusion length. This corresponds to a surface recombination velocity of some $10^3$ cm sec$^{-1}$ which is low even for good cells. Taking values for the various parameters of $L_p = 7.2\mu$, $d = 0.1\mu$, $D_p = 1.2$ cm² sec$^{-1}$ and $S_p < 10^3$ cm sec$^{-1}$, it is possible to replace $\cos^2(ud)$ by one and neglect the $\sin^2(ud)$ in the denominator altogether. It is then possible to integrate eq. (9) analytically with the result:

$$j_p = q\alpha N_\lambda' T^{-1} e^{-t\alpha d + \alpha^2 t} \{[erf(\alpha \sqrt{t}) - erf(\alpha \sqrt{t} - \quad (10)$$
$$\frac{d}{2\sqrt{t}})] + \frac{\beta - 1}{4\beta^2} e^{2\alpha d}[erf(\alpha \sqrt{t} + \frac{d}{2\sqrt{t}}) -$$
$$erf(\alpha \sqrt{t} + \frac{d}{2\sqrt{t}})] - \frac{\beta^2 - 1}{\beta 4^2} e^{-2\alpha d}[erf(\alpha \sqrt{t} - \frac{d}{2\sqrt{t}} - $$
$$erf(\alpha \sqrt{t} + \frac{d}{2\sqrt{t}})]\}$$

But since $\lambda$ is large compared to $d$, it is possible to use the asymptotic expansion for the error functions in eq. (10) and obtain for not too small times:

$$j_p(t) = q N_\lambda' T^{-1} \frac{e^{-t}}{\sqrt{\pi t}} (1 - (2\beta)^{-2}) \; t > 10^{-2}, \beta > 1 \quad (11)$$

independent of the absorption coefficient of light. In the opposite case $\beta \ll 1$ corresponding to large surface recombination velocities $S_p$ we obtain from eq. (9):

$$j_p(t) = q N_\lambda' T^{-1} \frac{e^{-t}}{\sqrt{\pi t}} (\alpha d)^{-1} \; t > 10^{-2}, \beta \ll 1 \quad (12)$$

The ratio of the two currents $$\frac{(j_p)S_p = 0}{(j_p)S_p = \infty} = \alpha d \simeq 10 \quad (13)$$

taking $\alpha$ to be 720 and $d = 0.014$ corresponding to the values listed above and an absorption length $L_\lambda = 0.01\mu$.

2. Red Light

P base, electron current.

In this case, we use the diffusion equation for electrons given by $$\left(\frac{\delta}{\delta x^2} - \frac{\delta}{\delta t} - 1\right) n(x,t) = -\tau L_\lambda^{-1} e^{-\alpha(x+d+W)} \phi(t) \quad (14)$$

Again the coordinates $x$ and $t$ are dimensionless, but this time $x$ is measured in units of $L_n$, the diffusion length for electrons and $t$ in units of $\tau_n$. We also introduce $\beta = L_{sn}/L_n$ and $\alpha = L_n/L_\lambda$ and omit all indices. $d$ in eq. (10) has now become $d/L_n$ rather than $d/L_p$ as in case 1 with $d$ the junction depth in units of length. The boundary conditions are again the usual ones, viz.

$$n(0,T) = 0 \quad \beta \frac{\delta n(x,t)}{\delta x}\bigg|_{x=l} = n(l,t) \quad (15)$$

where $l = T_h - d - W$ in units of $L_n$.

Again performing a Laplace transformation replacing $L_n$ by $(S+1)^{-\frac{1}{2}}$, etc. in eqs. (2), we find in complete analogy to case 1. that the current density due to an impulse of duration T is given by:

$$j_n(t) = q N_\lambda' T^{-1} \alpha e^{-\alpha d - t} \frac{2}{\pi} \int_0^l dx \int_0^\infty du_-{u^2 t - \alpha x} \quad (16)$$
$$(\beta^2 \cos^2(ul) + \sin^2(ul))^{-1} [\sin(u(l-x)) \sin(ul) +$$
$$\beta^2 \cos(u(l-x))\cos(ul)]$$

With prevailing values for typical P base material $L_n$ between 50 and 200$\mu \simeq 250\mu$, we see that the integral cannot be approximated for large or small $\beta$ as in the previous case. Numerical computations must be employed. This has been done with the results indicated in the next paragraph. Here, as in the integral of eq. (9), the integral of eq. (16) can be evaluated analytically if $\beta = 1$ (mached diffusion condition).

It has thus been shown that if a solar cell is subjected alternatively to high frequency (blue) and low frequency (red) light pulses, the lifetimes of the diffused N layer and of the bulk P material can be measured. Furthermore, the bulk diffusion length can also be ascertained. Since these parameters determine the efficiency of a solar cell, a scheme can be devised which allows for a quick and easy quality control testing of solar cells. Such a scheme is important when large arrays of solar cells are built.

SUMMARY OF THE INVENTION

In accordance with the present invention a reference P-N junction solar cell is connected with a short-circuit conductor between the irradiated surface layer N and the base layer P, and the base layer is connected to circuit ground. The reference cell is irradiated by a steady lamp to simulate solar radiation and produce a steady short circuit current through the short-circuit conductor. The cell is then irradiated with short synchronized pulses of low frequency (red) and high frequency (blue) light in the presence of the simulated solar radiator. Short-circuit current through the conductor engendered by the light pulses are sensed by a coil and displayed on an oscilloscope, first through a differentiating circuit during the red light pulse, and then through an amplifier during an interval between the red light and the blue light pulse, and during the blue light pulse. The signal displayed is a measure of the lifetimes and diffusion length of the cell. If the cell is a reference cell, a cell to be tested may be connected in reverse parallel such that with these parameters (life time and diffusion length) of the test cell matching the reference cell, the output display is substantially a steady state zero output. Testing these parameters of cells being produced against a reference cell allows for quickly qualifying production cells for efficiency since these parameters determine the efficiency of solar cells.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
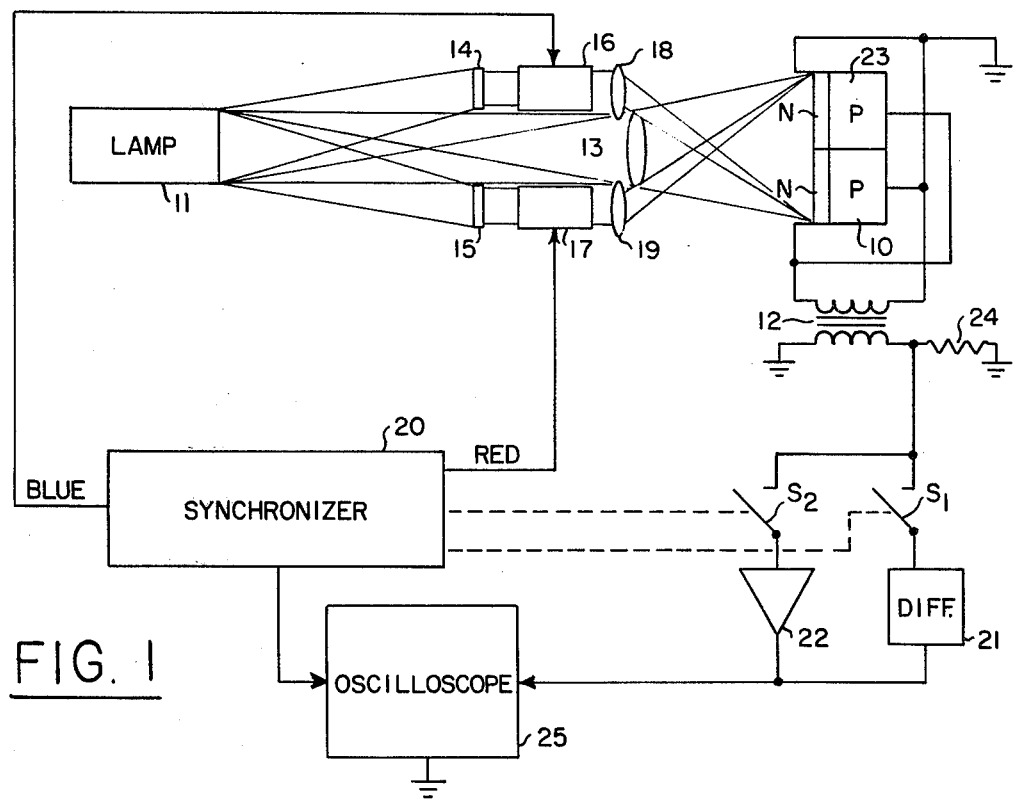
FIG. 1 is a schematic diagram of apparatus for implementing the present invention.

Referring now to FIG. 1 of the drawings which discloses schematically a system for implementation of the present invention, a P-N junction silicon solar cell 10 is irradiated by a lamp 11 to produce a steady-state short-circuit current through the primary winding of a current transformer 12. The lamp simulates solar radiation. Radiation from the lamp is directed to the cell by a lens 13.

Radiation from the lamp is also directed to the cell 10 through blue and red filters 14 and 15, Kerr cells 16 and 17 and 18 and 19. The Kerr cells are employed to pass a pulse of light of very short duration to the solar cell 10 by applying an electric pulse across the cell for a very short time under control of a synchronizer 20. The synchronizer opens up the Kerr cell 17 to pass a pulse of red light for about $10^{-7}$ seconds, where the electron lifetime, $\tau_n$, for a p-type semiconductor is about $10^{-5}$ seconds. Then after a period of 1 millisecond or more, the synchronizer opens up the Kerr cell 16 to pass a pulse of blue light for about $10^{-8}$ seconds, where the minority carrier life time (hole life time) $\tau_p$ in an n-type semiconductor is about $10^{-6}$. The filters 14 and 15 produce the light of selected (blue and red) frequencies, but that is only one way of doing that. The short pulses of light of selected frequencies might be produced with lasers, in which case the function of the Kerr cells is performed by the pulsed lasers. In any case, the timing is, of course, quite flexible, i.e., the timing of the red and blue pulses of light is not critical.

The optics comprised of the solar simulator lens 13, and the blue and red lenses 18 and 19, directs the light of the solar simulator together with the blue and red pulses toward the solar cell 10. The time-dependent short-circuit current engendered by the red and blue pulses is sensed by the transformer 12. The reason for the presence of the light from the solar simulator during the application of the red and blue pulses is simply that, in a partially compensated semiconductor, as all solar cells are, the condition of the flaws or traps vitally influence the life time or recombination rate. Therefore, care must be taken to measure the pertinent parameters of a solar cell while it is subjected to solar radiation.

Figure 2:
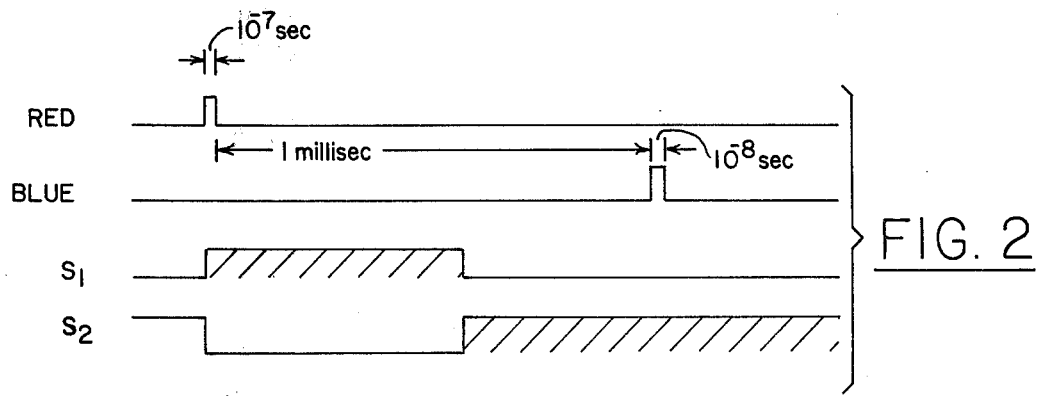
FIG. 2 is a timing diagram for the synchronization of the apparatus of FIG. 1.

The transformer 12 picks up the currents pulses produced by the red and blue light pulses. These pulses are applied to a differentiating network 21 and an amplifier 22 through switches $S_1$ and $S_2$. First a red-light current pulse is applied to the differentiating network from the time the red Kerr cell is pulsed to a time when the current pulse has decayed to a level that requires amplification for display purposes. Then the switch $S_1$ is opened and a switch $S_2$ is closed to connect the transformer to an amplifier 22. FIG. 2 illustrates this timing sequence.

The signal retrieved via the transformer is distorted due to a number of causes, which include DC and AC capacitance of the p-n junction, internal resistance, admittance of the transformer secondary winding, and the resistance of the short circuit link between the n-layer and the p-layer, as well as feedback from the electronic circuits connected to the secondary winding. For actual measurements of life time and diffusion lengths, they must be taken into consideration. However, for relative measurements they need not, as when comparing a solar cell 23 with the solar cell 10 used a reference.

Figure 3:
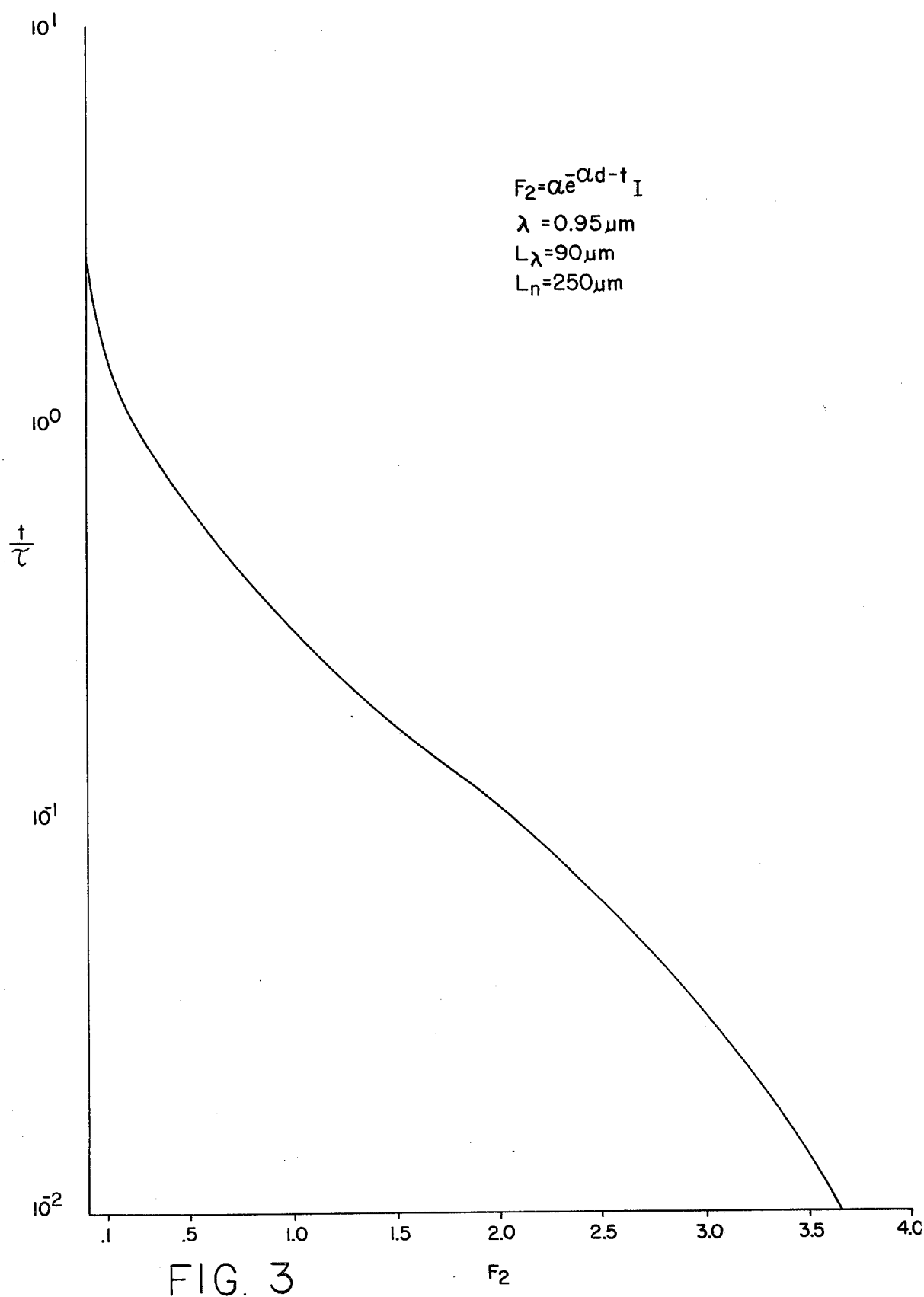
FIG. 3 is a graph showing decay of electron current of bulk material produced by a near infrared light pulse.
Figure 4:
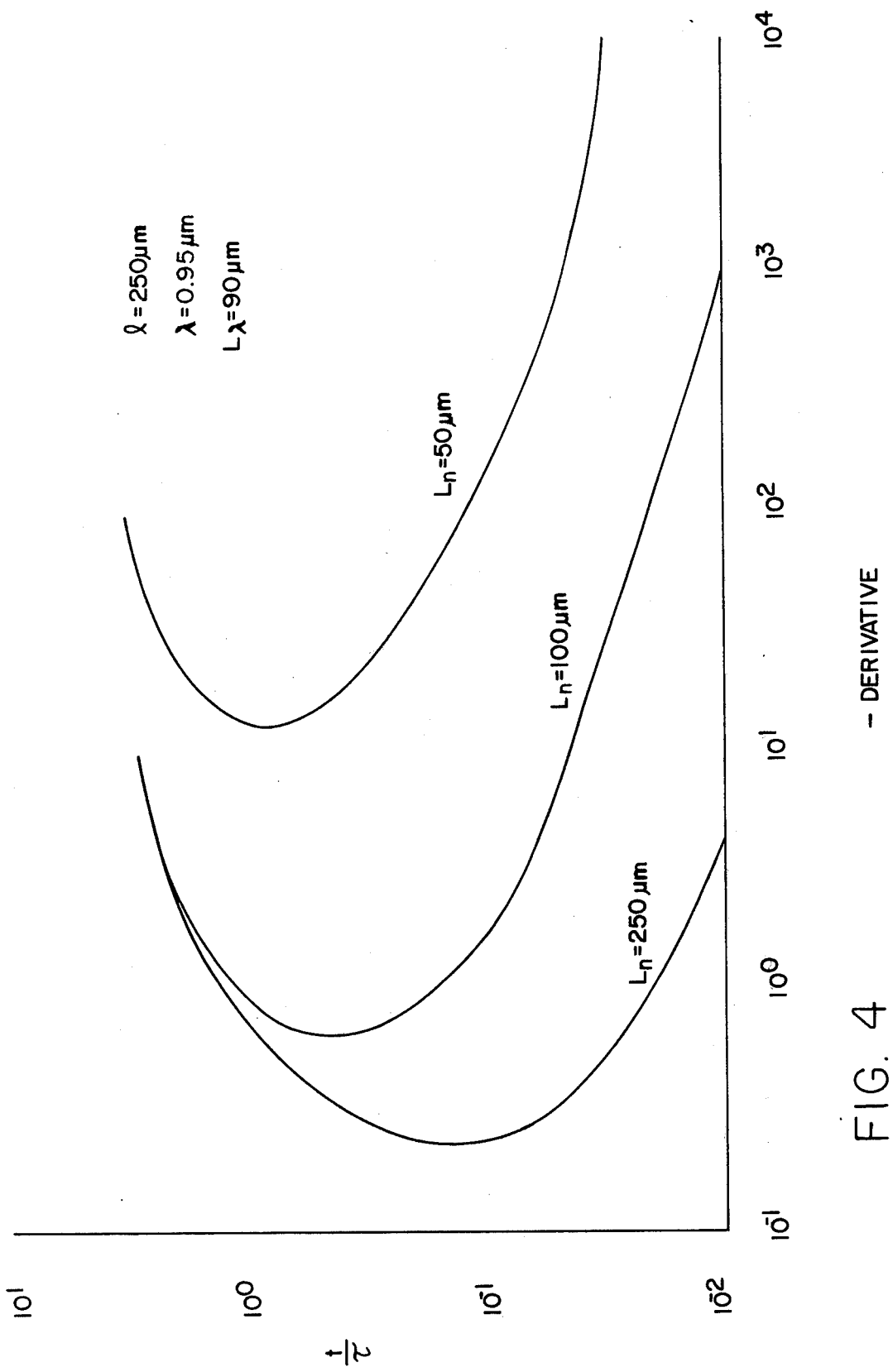
FIG. 4 is a graph showing the derivative of the electron current of FIG. 3 at the early stages of the decay.

When the synchronizer triggers the red Kerr cell, it closes the switch $S_1$. At that time the signal in the transformer is large enough to dispense with amplification for display. The resistance of a bleeder resistor 24 is much larger than the switch $S_1$ resistance. Consequently, the sensed current flows into the differentiator for display of the derivative of the sensed current $F_2$ at the early stages of decay. FIG. 3 illustrates this decay, and shows that during the initial stages the decay is parabolic, and then it becomes exponential. The display of the derivative $dF_2/dt$ in FIG. 4 is a measure of the diffusion length of the bulk silicon material of the solar cell. As time passes, the current reaches a low level (usually at $t \simeq \tau_n$, the electron life time). At that time the switch $S_1$ is opened and the switch $S_2$ is closed. The voltage now developed across the resistor 24 proportional to the low level current is amplified for display. An oscilloscope 25 is synchronized for its horizontal sweep by the synchronizer 20 in order to dispaly current amplitude as a function of time from the time of the red light pulse until a time well after the blue light pulse. In that manner, the carrier life time $\tau_n$ for the base of a silicon solar cell can be determined from the oscilloscope trace. The same is true for the carrier life time $\tau_p$ of the diffused n-layer from the trace displayed following the blue light pulse. At the same time, bulk diffusion length is determined. However, quantitative measurements can not be made without taking other factors extraneous to the solar cell into consideration. Nevertheless, these qualitative measurements are useful to compare a solar cell with a standard, as will now be described.

To compare a given solar cell 23 with a standard cell 10, the given cell is connected to the transformer 12 in reverse parallel. Both cells 10 and 23 receive the same radiation from the solar simulating lamp 11 through the lens 13 and the red and blue filters. If the cell 23 under test matches the reference cell 10, the output displayed on the oscilloscope will be substantially zero in the presence of red and blue light pulses. In that manner, solar cells produced commercially, or experimentally, may be easily tested qualitatively by comparing the cells with a reference cell. This method and apparatus thus provid for practical quality control of solar cell production. The flexibility of the system is such that other types of solar cells, such as $N^{+P}P^{+}$ junction solar cells, or any other type of semiconductor diode used as a photovoltoic cell, can be accommodated quite easily without any essential change, i.e., with only initial calibration of impedances involved in the display system.

Although particular embodiments of the invention have been described and illustrated herein, it is recognized that modifications and variations may readily occur to those skilled in the art. It is therefore intended that the claims be interpreted to cover such modifications and variations.

What is claimed is:

1. A method for qualitatively measuring minority carrier lifetimes and bulk diffusion length of a P-N junction solar cell by irradiating the cell with light from a solar simulator, alternately applying low-frequency monochromatic light pulses and high frequency monochromatic light pulses, and synchronously displaying the derivative of the output voltage of the cell on an oscilloscope as said light pulses are applied at spaced intervals, where the interval between pulses is equal to or greater than about 1 millisecond and the low-frequency and high-frequency pulses are about $10^{-7}$ and $10^{-8}$ seconds, respectively.

2. A method as defined in claim 1 wherein a low-frequency monochromatic pulse is applied and the output of said cell is connected to said oscilloscope through a differentiating circuit for a period greater than the low-frequency monochromatic pulse of light, and the output of said cell is connected to said oscilloscope through an amplifier at all other times.

3. A method as defined in claim 2 wherein said cell is a reference cell, and a further solar cell to be compared with said reference cell is connected in reverse parallel with said reference cell, and positioned to be irradiated in the same manner and at the same time as said reference cell by said solar simulator and said low-frequency and high-frequency monochromatic pulse.

4. Apparatus for qualitatively measuring minority carrier lifetimes and bulk diffusion length of a P-N junction solar cell comprising means for irradiating the cell with light from a solar simulator, means for alternately applying low-frequency monochromatic light pulses and high frequency monochromatic light pulses in the presence of light from said solar simulator, and means for synchronously displaying the derivative of the output voltage of the cell as said light pulses are applied at spaced intervals, where the interval between pulses is equal to or greater than about 1 millisecond and the low-frequency and high-frequency pulses are about $10^{-7}$ and $10^{-8}$ seconds, respectively.

5. Apparatus as defined in claim 4 wherein said displaying means is comprised of an oscilloscope, differentiating circuit and amplifier, and means for connecting the output of said cell to said oscilloscope through a differentiating circuit for a period greater than the low-frequency monochromatic pulse of light commencing with the instant the low-frequency light pulse is applied, and means for connecting the output of said cell to said oscilloscope through said amplifier at all other times.

6. Apparatus as defined in claim 5, wherein said cell is a reference cell, said apparatus including means for connecting a further solar cell to be compared with said reference cell in reverse parallel with said reference cell, and in a position to be irradiated in the same manner and at the same time as said reference cell by said solar simulator means and said low-frequency and high-frequency monochromatic pulse means.

7. Apparatus as defined in claim 5 wherein said low-frequency and high-frequency monochromatic pulse means is comprised of separate low-frequency and high-frequency filters disposed to receive light from said solar simulator, separate Kerr cells disposed to interrupt light from said filters to said cell, and synchronizing means for alternately triggering said Kerr cells to transmit light in synchronism with display on said oscilloscope of the output of said cell.

8. Apparatus as defined in claim 7 wherein said Kerr cell interrupting low-frequency light from one of said filters is triggered to transmit light for a period of about $10^{-7}$ seconds, said Kerr cell interrupting low-frequency light from the other one of said filters is triggered to transmit light for a period of about $10^{-8}$ seconds after about 1 millisecond following the triggering of said Kerr cell interrupting low-frequency light.

9. Apparatus as defined in claim 8 wherein said cell is a reference ceil, said apparatus including means for connecting a further solar cell to be compared with said reference cell in reverse parallel with said reference cell, and in a position to be irradiated in the same manner and at the same time as said reference cell by said solar simulator means and said low-frequency and high-frequency monochromatic pulse means.

* * * * *